(12) United States Patent
Chi et al.

(10) Patent No.: US 12,126,620 B2
(45) Date of Patent: Oct. 22, 2024

(54) ACCOUNT DELEGATION VIA BROWSER SUPPLEMENT MODULE

(71) Applicant: International Business Machines Corporation, Armonk, NY (US)

(72) Inventors: Wen-Ping Chi, New Taipei (TW);
Andy Min-Tsung Wu, Taipei (TW);
Hsiao-Yung Chen, New Taipei (TW);
Hsin-Yu Hsieh, Taipei (TW); Wendy Ping Wen Wang, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 17/093,705

(22) Filed: Nov. 10, 2020

(65) Prior Publication Data

US 2022/0150250 A1    May 12, 2022

(51) Int. Cl.
 *H04L 9/40*    (2022.01)
(52) U.S. Cl.
 CPC ................... *H04L 63/0884* (2013.01)
(58) Field of Classification Search
 CPC ............ H04L 63/0884; H04L 63/08
 See application file for complete search history.

(56) References Cited

U.S. PATENT DOCUMENTS

| | | | | |
|---|---|---|---|---|
| 6,058,426 A * | 5/2000 | Godwin | ........... | G06F 9/468 709/224 |
| 8,973,108 B1 * | 3/2015 | Roth | ........... | G06F 21/00 726/28 |
| 9,401,918 B2 | 7/2016 | Lu et al. | | |
| 2011/0296497 A1 * | 12/2011 | Becker | ........... | H04L 63/0807 726/4 |
| 2014/0020051 A1 * | 1/2014 | Lu | ........... | H04L 63/10 726/4 |
| 2014/0126581 A1 * | 5/2014 | Wang | ........... | H04L 67/125 370/431 |

(Continued)

FOREIGN PATENT DOCUMENTS

| WO | 2014138420 A1 | 9/2014 |
|---|---|---|
| WO | 2019091907 A1 | 5/2019 |

OTHER PUBLICATIONS

Hundera et al., "A Secure and Efficient Identity-Based Proxy Signcryption in Cloud Data Sharing", KSII Transactions on Internet and Information Systems, vol. 14, No. 1, Jan. 2020, 19 pages.

(Continued)

*Primary Examiner* — Huan V Doan
(74) *Attorney, Agent, or Firm* — Scott S. Dobson

(57) ABSTRACT

Account delegation is provided. A request for access to a secure system using an owner's account is received from an applier via a browser supplement module on the applier's computing device. The request is communicated to the account owner via a browser supplement module on the account owner's computing device. Approval of the request is received from the account owner. The secure system is logged into using the account owner's credential. A connection to the applier's computing device is established to act as a proxy for communication between the secure system and the applier's computing device. Further provided herein are a computer system and a computer program product for performing the method.

9 Claims, 6 Drawing Sheets

(56) References Cited

U.S. PATENT DOCUMENTS

2014/0310769 A1* 10/2014 O'Neill .................. H04L 63/10
726/1
2015/0007269 A1* 1/2015 Brugger .............. H04L 63/0407
726/4
2018/0349625 A1 12/2018 Ikram

OTHER PUBLICATIONS

"Logging in Users for Browser-Based Authentication", Website, printed Jul. 23, 2020, 1 page. https://developer.yahoo.com/bbauth/user.html.
"The App Garden", flickr, printed Jul. 22, 2020, 5 pages. https://www.flickr.com/services/api/auth.oauth.html.
"AuthSub in the Google Data Protocol Client Libraries", Google Data APIs, printed Jul. 22, 2020, 2 pages. https://developers.google.com/gdata/docs/auth/authsub.
Mell et al., "The NIST Definition of Cloud Computing", Recommendations of the National Institute of Standards and Technology, Special Publication 800-145, Sep. 2011, 7 pages.

* cited by examiner

ACCOUNT DELEGATION VIA BROWSER SUPPLEMENT MODULE

BACKGROUND

The present disclosure relates to secure system access control, and more specifically, to delegation of access permission for secure systems.

Occasionally, situations arise that require an account owner to share access to their account on a secure system. For example, an account owner may need to share access with a colleague, customer, or family member. Some systems have a delegation feature that allows users to temporarily share their secure system privileges with others. However, not all systems provide such a delegation feature.

SUMMARY

According to embodiments of the present disclosure, a computer-implemented method is provided. The method includes receiving a request for access to a secure system using an owner's account from an applier via a browser supplement module on the applier's computing device. The request is communicated to the account owner via a browser supplement module on the account owner's computing device. Approval of the request is received from the account owner. The secure system is logged into using the account owner's credential. A connection to the applier's computing device is established to act as a proxy for communication between the secure system and the applier's computing device. Further provided herein are a computer system and a computer program product for performing the method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
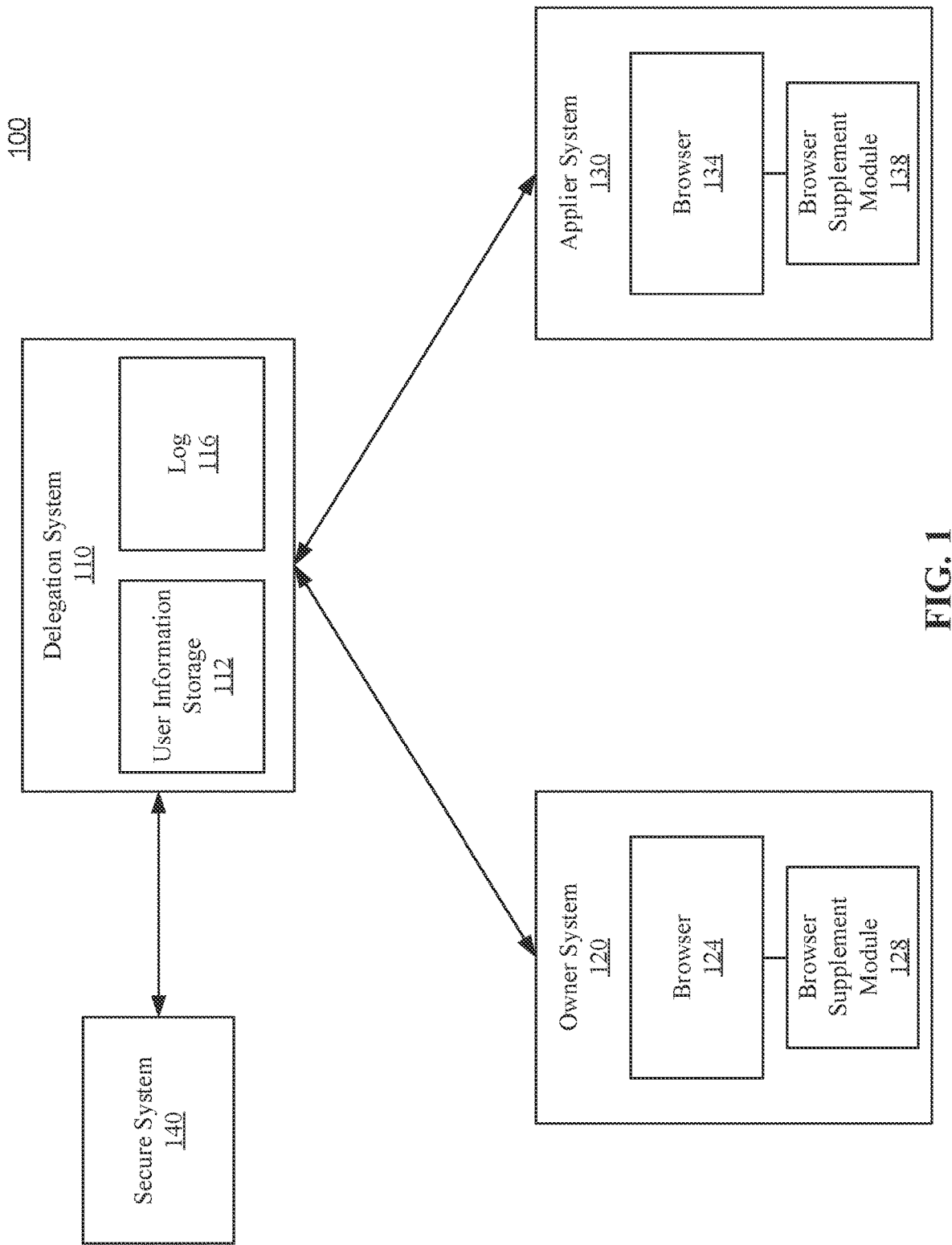
FIG. 1 depicts a centralized delegation environment according to embodiments.

While the invention is amenable to various supplements and alternative forms, specifics thereof have been shown by way of example in the drawings and will be described in detail. It should be understood, however, that the intention is not to limit the invention to the particular embodiments described. On the contrary, the intention is to cover all supplements, equivalents, and alternatives falling within the spirit and scope of the invention.

DETAILED DESCRIPTION

Aspects of the present disclosure relate to secure system account delegation, and more particular aspects relate to browser supplement modules for secure system account delegation. While the present disclosure is not necessarily limited to such applications, various aspects of the disclosure may be appreciated through a discussion of various examples using this context.

When account owners don't have access to a delegation feature, they tend to share their credentials with others. This introduces security risks and the account owner's control over their account.

Embodiments of the present disclosure may provide for account delegation without revealing the owner's credentials to other users. Using a browser supplement module, an applier can send a request to an account owner to access the owner's secure system account. The browser supplement module may be a piece of software that extends the functionality of a browser, such as a plugin, extension, add-on, etc. Thus, embodiments of the present disclosure may be implemented for systems that do not have a delegation feature. With the account owner's approval, the applier may be given access to a secure system via a delegation system (centralized) or a browser supplement module on the account owner's system (decentralized). In centralized embodiments, the delegation system may use access control, certificates, single sign on (SSO), etc. to identify users. In decentralized embodiments, the owner's system may use certificates, Oauth, SSO, etc. to identify requesters.

In centralized embodiments, each user of the delegation system may install and activate a browser supplement module on their computer system to act as a client of a delegation system. Upon activation of the browser supplement module, an account owner may enter user information into the browser supplement module to register with an account delegation server. The user information may include a user account name for a secure system. For example, a user account name could be in the format username@domain.com. The account owner's browser supplement module may send the user information for the account owner and an Internet Protocol (IP) address for the account owner's computer system to the account delegation server. The account delegation server may store the user information and IP address for later use. When an applier wants to access the owner's account on the secure system, they may enter the user information for the owner (e.g., in the format owner@securesystem.com) into the browser supplement module on their computer system and the browser supplement module may send a request to the account delegation server with the user information. The account delegation server may use the user information to identify the IP address of the account owner's computer system. The account delegation server may map the IP address and send the applier's request to the account owner. The account owner's browser supplement module may receive the request and prompt the account owner to approve the request. The account owner may approve the request and enter their credential into the browser supplement module. The browser supplement module may communicate the account owner's credential to the account delegation server. The account delegation server may login to the secure system using the account owner's credential and establish a connection with the applier system to act as a proxy for communication between the applier and the secure system. The account delegation server may maintain a log of the applier's actions using the secure system while acting as proxy. The owner may use the browser supplement module to access the log and stop the connection when they choose.

In decentralized embodiments, each user of the delegation system may install and activate a browser supplement module to act as a system agent. An applier may enter an IP address and user information for an account owner into their browser supplement module (e.g., in the format owner@domain.com/192.168.10.1). The applier's browser supplement module may map the IP address and send a request to access a secure system with the user information to the account owner's computer system. In response to receiving the request, the account owner's browser supplement module may prompt the account owner to approve the request. The account owner may approve the request and log in to the secure system using the account owner's credential. The account owner's browser supplement module may establish a connection with the applier's system and act as a proxy for communication between the applier and the secure system. The account owner's browser supplement module may log actions taken by the applier using the secure system.

Referring now to FIG. 1, a centralized delegation environment 100 is depicted according to embodiments. Environment 100 includes a delegation system 110, owner system 120, applier system 130, and secure system 140. Each system may be implemented using a computer system such as computer system 501 described in reference to FIG. 5. In some embodiments, delegation system 110 may be implemented in a cloud computing environment.

Delegation system 110 may be computing system, such as a server, configured to provide secure system account delegation for an account owner using owner system 120 and an applier using applier system 130. Delegation system 110 may be configured to communicate over one or more networks with owner system 120, applier system 130, and secure system 140. Delegation system 110 includes user information storage 112. User information storage 112 may store user information such as user addresses (e.g., IP addresses) and user identification (such as a username for the secure system 140). User information storage 112 may be any suitable storage device. In some embodiments, user information storage 112 may be an external storage, such as a database, in communication with delegation system 110. Delegation system 110 may also store a log 116. Delegation system 110 may store, in log 116, actions taken by a user of applier system 130 while accessing another user's secure system account using the delegation system. Log 116 may be stored in any suitable storage device. In some embodiments, log 116 may be stored in the same storage device as user information storage 112.

Owner system 120 includes a browser 124 and browser supplement module 128. Applier system 130 also includes a browser 134 and browser supplement module 138. Browser supplement modules 128 and 138 may be configured to provide additional functionality to browsers 124 and 134, respectively, to have them function as clients of delegation system 110. Browser supplement modules 128 and 138 may be configured to communicate with delegation system 110 for user registration and secure system account delegation for secure system 140. Browsers 124 and 134 may be the same type of browser or may be different. In some embodiments, the browser supplement module is the same for an applier and an owner. For example, owner system 120 and applier system 130 may be essentially the same, with either system capable of requesting access to a secure system account of a user of the other system. In other embodiments, a different browser supplement module may be used to implement functions for the account owner of a secure system than the functions for an applier to use an account owner's secure system account. While two user systems and one secure system are depicted, embodiments could include any number of user systems and any number of secure systems.

Figure 2:
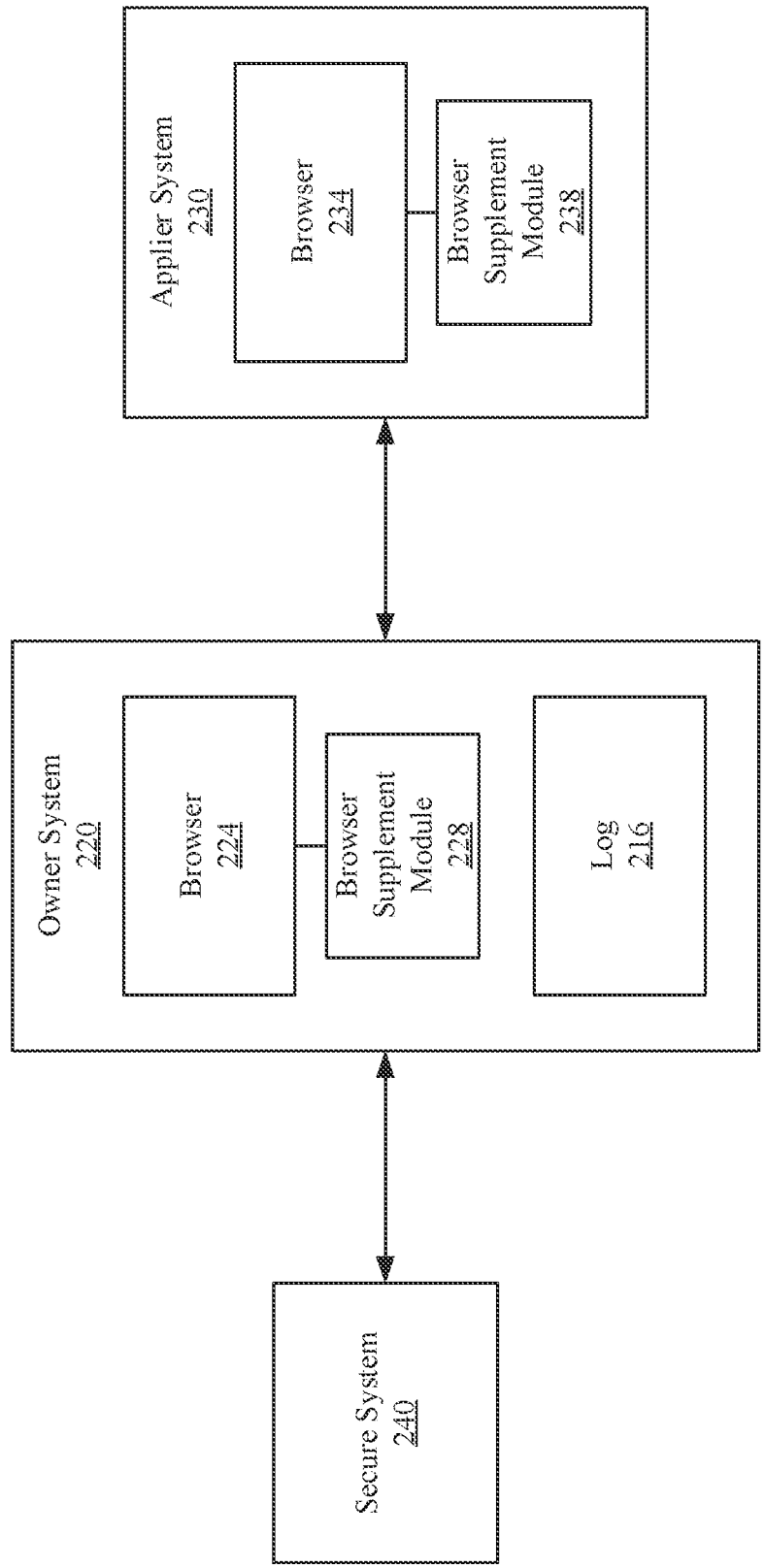
FIG. 2 depicts a decentralized delegation environment according to embodiments.

Referring now to FIG. 2, a decentralized delegation environment 200 is depicted according to embodiments. Environment 200 includes owner system 220, applier system 230, and secure system 240. Owner system 220 includes a browser 224 and a browser supplement module 228. Applier system 230 also includes a browser 234 and a browser supplement module 238. Browser supplement modules 228 and 238 may be configured to provide additional functionality to browsers 224 and 234, respectively, to have them function as a delegation system agent. Browsers 124 and 134 may be the same type of browser or may be different. In some embodiments, the browser supplement modules 228 and 238 may be configured to perform the same functions. For example, owner system 120 and applier system 130 may be essentially the same, with either system capable of requesting access to a secure system account of a user of the other system. In other embodiments, a different browser supplement module may be used to implement functions for the owner of a secure system account than the functions for an applier to use an owner's secure system account. Owner system 220 further includes a log 216. Owner system 220 may store, in log 216, actions taken by a user of applier system 230 while accessing the owner's secure system account using the delegation system. Log 116 may be stored in any suitable storage device.

As mentioned above, in some embodiments, the browser supplement modules 228 and 238 may be configured to act as either the applier. Thus, in some embodiments, Applier system 230 could connect to a secure system on behalf of the owner system and include a log for tracking actions taken by the owner system.

Figure 3:
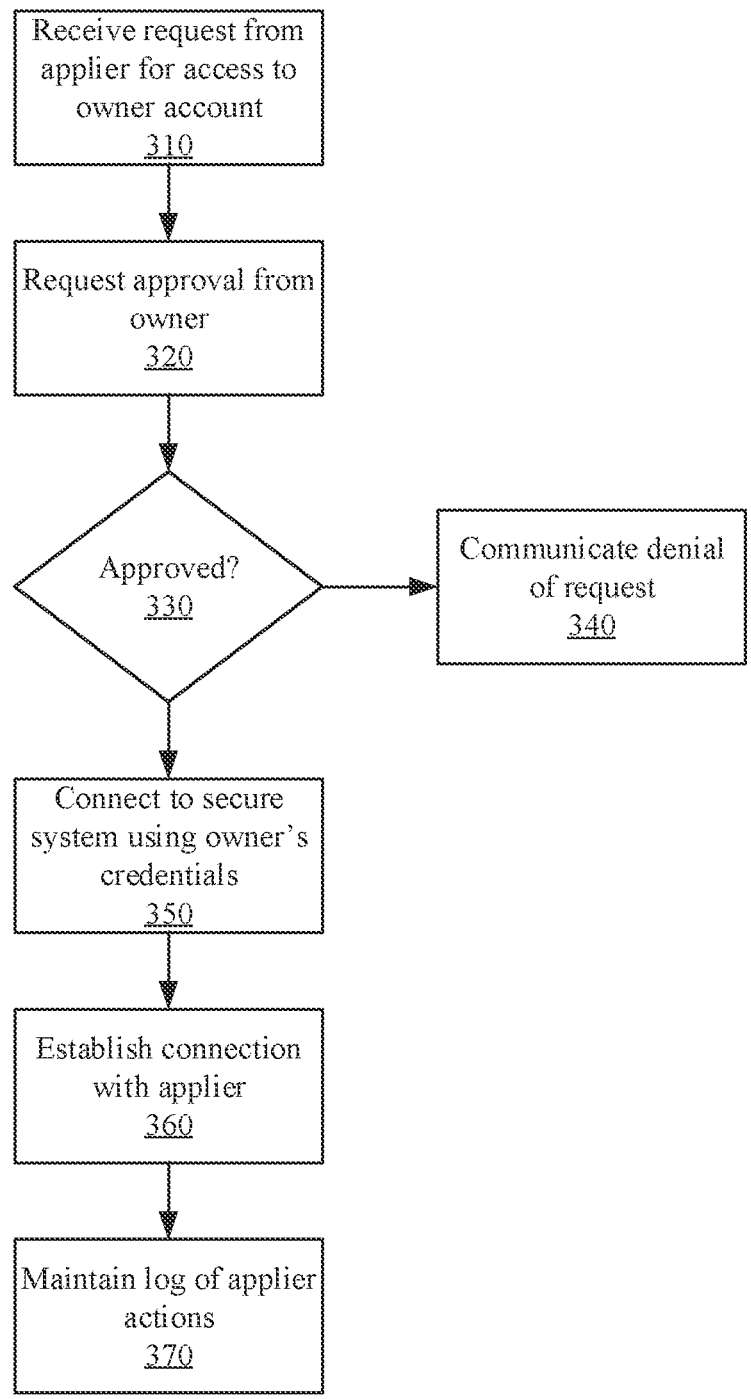
FIG. 3 depicts a flowchart of a method for secure system account delegation according to embodiments.

Referring now to FIG. 3, a flowchart of a method 300 for secure system account delegation is depicted according to embodiments. Method 300 may be performed by an account delegation system (in centralized embodiments) or a secure system account owner's computer system (in decentralized embodiments). Method 300 will first be described in reference to centralized delegation environment 100 from FIG. 1.

Prior to executing method 300, account delegation system 110 may collect user information from owner system 120 during a registration process. The registration process may occur in response to a user of owner system 120 activating browser supplement module 128. Upon activation, browser supplement module 128 may cause owner system 120 to communicate user information to delegation system 110 over one or more networks. For example, owner system 120 may communicate user identification and an address (such as an IP address) for owner system 120. Browser supplement module 128 may prompt the account owner to enter their user identification for the account to send it to delegation system 110.

At operation 310, the account delegation system 110 receives a request from applier system 130 to log in to the secure system 140 as the account owner. An applier may input a user identification (such as a username for the secure service account) into browser supplement module 138 and the module may cause applier system 130 to communicate the request with the user identification over one or more networks to delegation system 110. The applier may also enter a specific secure system, such as secure system 140, and the module may include the specific secure system in the request.

At operation 320, the account delegation system 110 may request approval for the request from the owner. In some embodiments, the account delegation system may identify an IP address for the user in user information storage 112 using a user identification provided in the applier's request. The account delegation system 110 may map the IP address and communicate the request to owner system 120. In response to receiving the request, browser supplement module 128 may prompt the owner to approve or deny the request.

At operation 330, the account delegation system 110 determines whether the request was approved. In some embodiments, the request may be denied by receiving a communication from owner system 120 indicating that the request is denied. For example, the owner may select option provided by browser supplement module 128 to deny the request and the module may cause owner system 120 to communicate the denial of the request to delegation system 110. In some embodiments, the request may be determined to be denied if no response is received from owner system 120 within a specified period of time. In response to the request being denied, account delegation system 110 may communicate the denial of the request to applier system 130 at operation 340.

The account delegation system 110 may determine that the request has been approved if a communication indicating that the request has been approved is received from owner system 120. In some embodiments, the communication from owner system 120 may include a credential for connecting to the owner's account on secure system 140. At operation 330, if the account delegation system 110 determines that the request has been approved, the account delegation system may connect to the secure system using the owner's credential at operation 350. In some embodiments, the credential may be received from owner system 120 with the approval of the request. In some embodiments, the credential may be retrieved from user information storage 112 if it was provided by the owner system 120 during registration.

At operation 360, account delegation system 110 establishes a connection with applier system 130 and acts as a proxy for communication between applier system 130 and secure system 140.

At operation 370, account delegation system 110 maintains a log 116 of actions taken by applier system 130 over the connection. The owner may request the log to review the actions that were taken by the applier while accessing the owner's account.

Method 300 will now be described in reference to decentralized delegation environment 200. At operation 310, owner system 220 receives a request to access secure system 240 from applier system 230. In some embodiments, an applier may enter user information for the account owner and the IP address for owner system 220 into browser supplement module 238. In response, browser supplement module 238 may map the IP address and cause applier system 230 to communicate the request to owner system 220 over one or more networks. The request may include the user information, such as a username, that identifies the account that the applier wants to access. In some embodiments, the applier further identifies secure system 240 in browser supplement module 238 and browser supplement module 238 includes the identification of secure system 240 in the request to owner system 220.

At operation 320, owner system 220 requests approval of the request from the owner of the account. In some embodiments, browser supplement module 228 may display the request information to the account owner including, for example, identification of the applier, user information for the account, and identification of the secure system. The account owner may approve the request and input their credential into browser supplement module 228 or may deny the request.

At operation 330, owner system 220 determines whether the request has been approved. If the owner has denied the request, owner system 220 may communicate the denial to applier system 230 at operation 340. If the owner approves the request, owner system 230 may establish a connection with secure system 240 using the owner's credential at operation 350.

At operation 360, owner system 220 establishes a connection with applier system 230 to act as a proxy for communications between applier system 230 and secure system 240.

At operation 370, owner system 220 maintains a log 216 of actions taken by applier system 230 over the connection to secure system 240.

Figure 4:
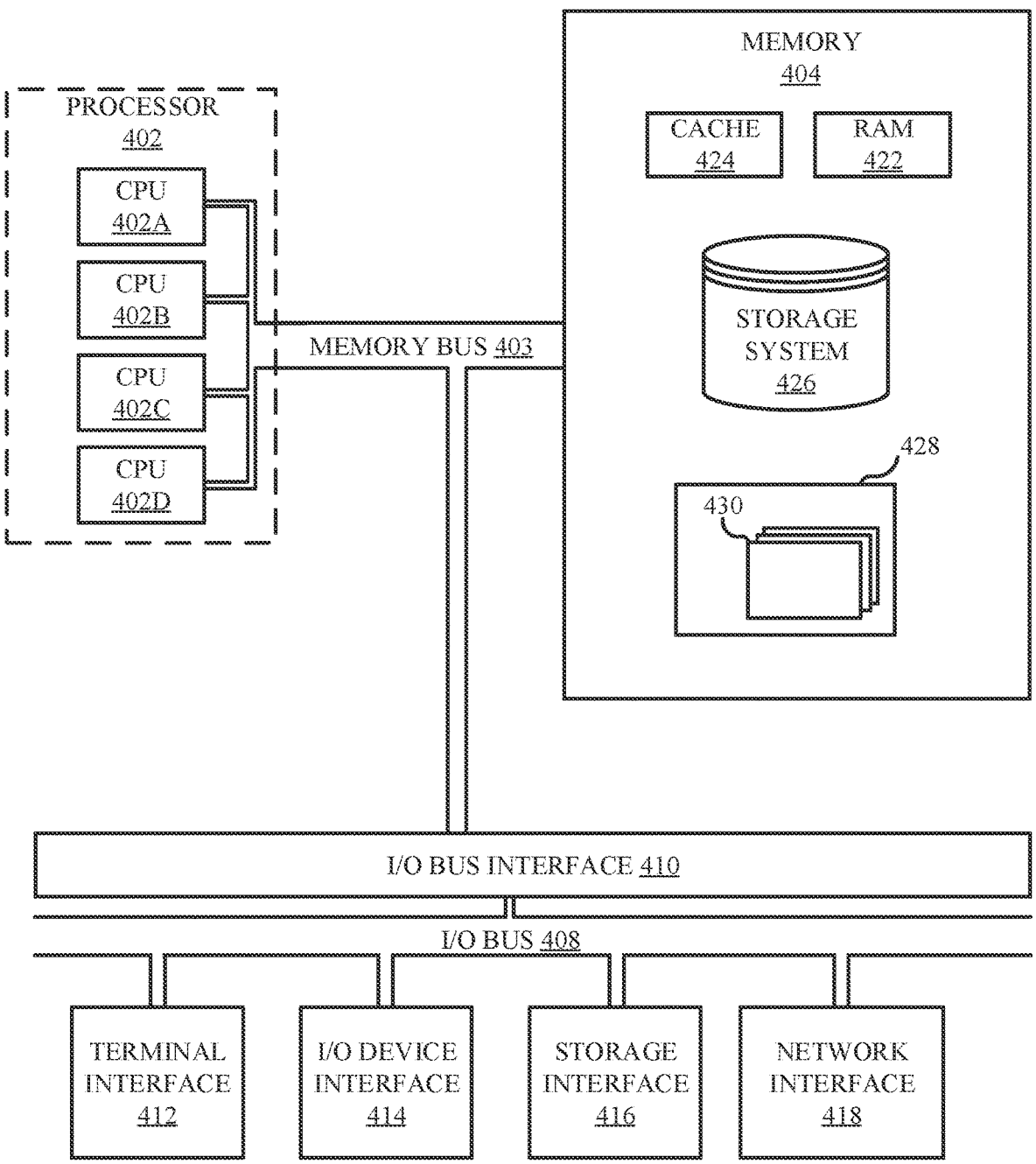
FIG. 4 depicts a block diagram of an example computer system according to embodiments.

Referring now to FIG. 4, shown is a high-level block diagram of an example computer system 401 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 401 may comprise one or more CPUs 402, a memory subsystem 404, a terminal interface 412, a storage interface 416, an I/O (Input/Output) device interface 414, and a network interface 418, all of which may be communicatively coupled, directly or indirectly, for inter-component communication via a memory bus 403, an I/O bus 408, and an I/O bus interface unit 410.

The computer system 401 may contain one or more general-purpose programmable central processing units (CPUs) 402A, 402B, 402C, and 402D, herein generically referred to as the CPU 402. In some embodiments, the computer system 401 may contain multiple processors typical of a relatively large system; however, in other embodiments the computer system 401 may alternatively be a single CPU system. Each CPU 402 may execute instructions stored in the memory subsystem 404 and may include one or more levels of on-board cache.

System memory 404 may include computer system readable media in the form of volatile memory, such as random access memory (RAM) 422 or cache memory 424. Computer system 401 may further include other removable/non-removable, volatile/non-volatile computer system storage media. By way of example only, storage system 426 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 may include at least one program product having a set (e.g., at least one) of program modules that are configured to carry out the functions of various embodiments.

One or more programs/utilities 428, each having at least one set of program modules 430 may be stored in memory 404. The programs/utilities 428 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 430 generally perform the functions or methodologies of various embodiments.

Although the memory bus 403 is shown in FIG. 4 as a single bus structure providing a direct communication path among the CPUs 402, the memory subsystem 404, and the I/O bus interface 410, the memory bus 403 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 may, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices may be connected directly to one or more system I/O buses.

In some embodiments, the computer system 401 may be a multi-user mainframe computer system, a single-user system, or a server computer or similar device that has little or no direct user interface, but receives requests from other computer systems (clients). Further, in some embodiments, the computer system 401 may be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components may have greater or lesser complexity than as represented in FIG. 4, components other than or in addition to those shown in FIG. 4 may be present, and the number, type, and configuration of such components may vary.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a browser).

Figure 5:
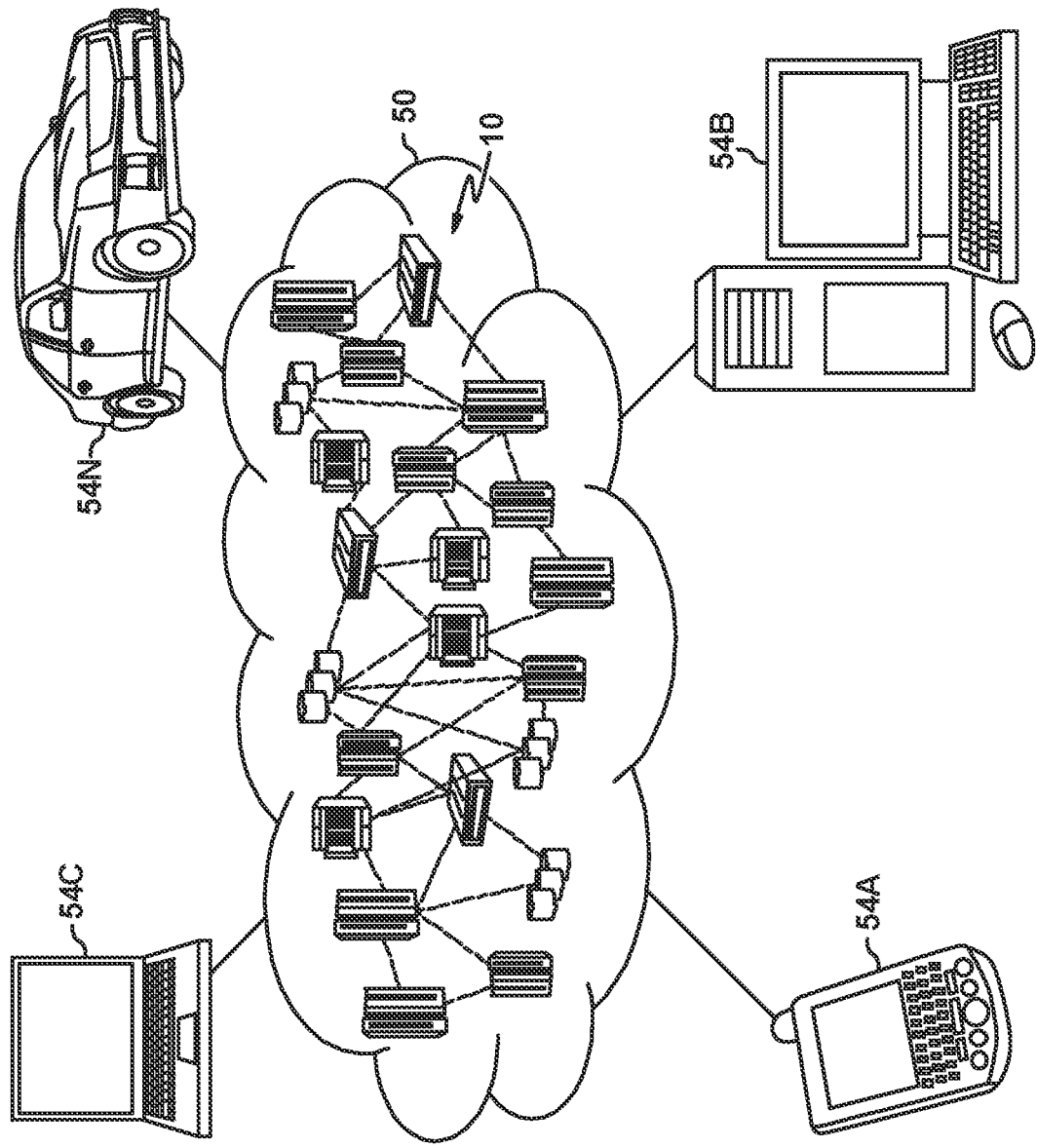
FIG. 5 depicts a cloud computing environment according to an embodiment of the present invention.
Figure 6:
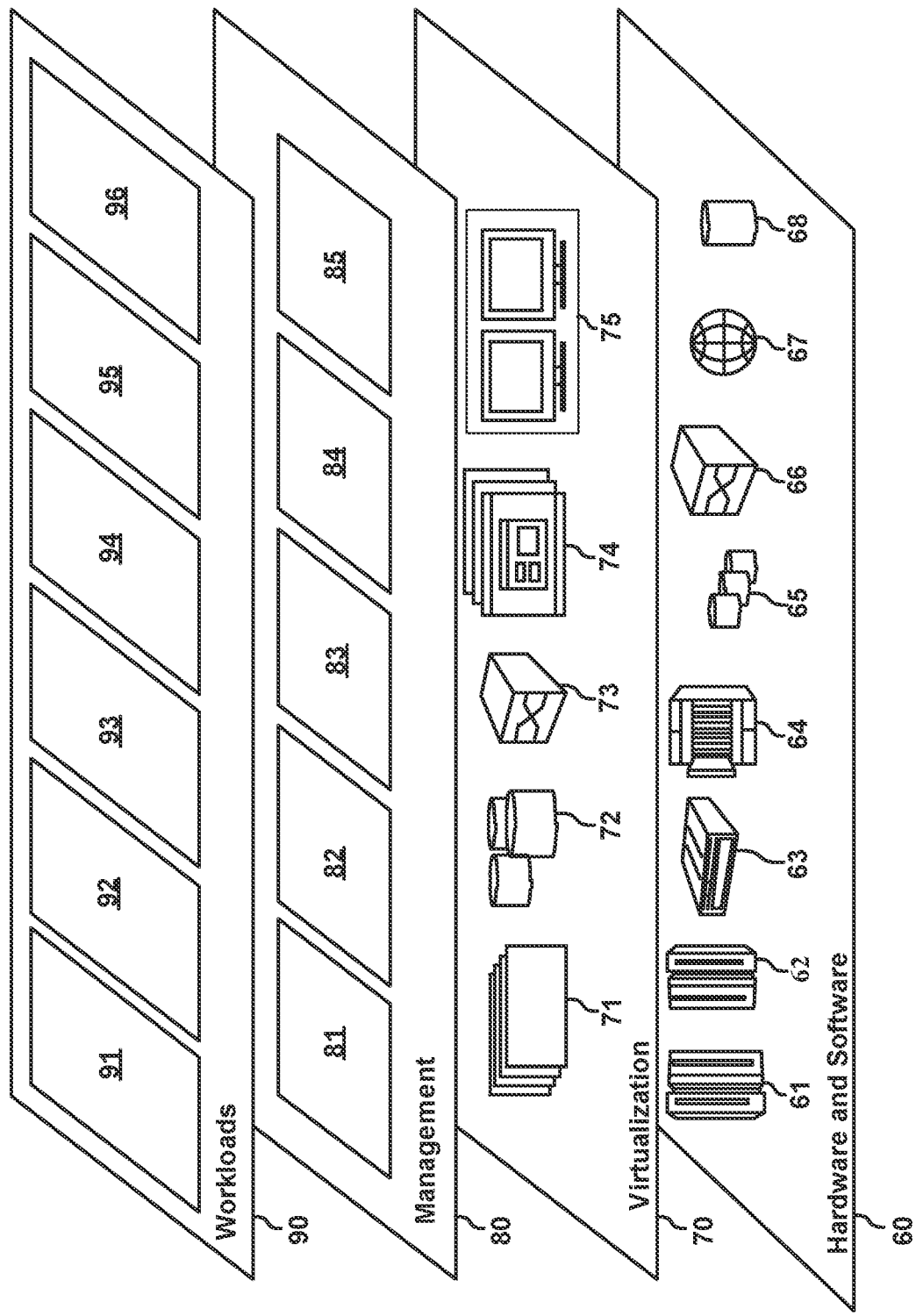
FIG. 6 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and secure system account delegation 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of exemplary embodiments of the various embodiments, reference was made to the accompanying drawings (where like numbers represent like elements), which form a part hereof, and in which is shown by way of illustration specific exemplary embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

The descriptions of the various embodiments of the present disclosure have been presented for purposes of illustration, but are not intended to be exhaustive or limited to the embodiments disclosed. Many supplements and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
receiving a request for access to a secure system using an owner's account from an applier via a browser supplement module on the applier's computing device;
communicating the request to the account owner via a browser supplement module on the account owner's computing device; receiving approval of the request from the account owner;
logging in to the secure system using the account owner's credential;
establishing a connection to the applier's computing device; and
acting as a proxy for communication between the secure system and the applier's computing device;
wherein the method is performed by the browser supplement module on the account owner's computing device.

2. The method of claim 1, further comprising maintaining a log of actions taken by the applier using the connection.

3. The method of claim 1, wherein receiving approval from the account owner comprises receiving the account owner's credential for accessing the secure system.

4. A computer system comprising:
a processor; and
a computer readable storage medium having program instructions embodied therewith, the program instructions executable by the processor to cause the processor to perform operations comprising:
receiving a request for access to a secure system using an owner's account from an applier via a browser supplement module on the applier's computing device;
communicating the request to the account owner via a browser supplement module on the account owner's computing device;
receiving approval of the request from the account owner;
logging in to the secure system using the account owner's credential;
establishing a connection to the applier's computing device; and
acting as a proxy for communication between the secure system and the applier's computing device;
wherein the program instructions are part of the browser supplement module on the account owner's computing device.

5. The system of claim 4, wherein the operations further comprise maintaining a log of actions taken by the applier using the connection.

6. The system of claim 4, wherein receiving approval from the account owner comprises receiving the account owner's credential for accessing the secure system.

7. A computer program product comprising a computer readable storage medium having program instructions embodied therewith, the program instructions executable by a processor to cause the processor to perform operations comprising:
receiving a request for access to a secure system using an owner's account from an applier via a browser supplement module on the applier's computing device;
communicating the request to the account owner via a browser supplement module on the account owner's computing device;
receiving approval of the request from the account owner;
logging in to the secure system using the account owner's credential;
establishing a connection to the applier's computing device; and
acting as a proxy for communication between the secure system and the applier's computing device;
wherein the program instructions are part of the browser supplement module on the account owner's computing device.

8. The computer program product of claim 7, wherein the operations further comprise maintaining a log of actions taken by the applier using the connection.

9. The computer program product of claim 7, wherein receiving approval from the account owner comprises receiving the account owner's credential for accessing the secure system.

* * * * *